US010354184B1

(12) United States Patent
Vitaladevuni et al.

(10) Patent No.: US 10,354,184 B1
(45) Date of Patent: Jul. 16, 2019

(54) JOINT MODELING OF USER BEHAVIOR

(71) Applicant: Amazon Technologies, Inc., Reno, NV (US)

(72) Inventors: Shiv Naga Prasad Vitaladevuni, Cambridge, MA (US); Nikko Ström, Kirkland, WA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 672 days.

(21) Appl. No.: 14/313,906

(22) Filed: Jun. 24, 2014

(51) Int. Cl.
*G06N 7/02* (2006.01)
*G06N 7/04* (2006.01)
*G06N 7/06* (2006.01)
*G06N 7/08* (2006.01)
*G06N 3/08* (2006.01)

(52) U.S. Cl.
CPC ..................................... *G06N 3/08* (2013.01)

(58) Field of Classification Search
CPC ........ G06N 3/049; G06N 3/02; G06N 99/005; G05B 13/027; G05B 13/048
See application file for complete search history.

(56) References Cited

U.S. PATENT DOCUMENTS

| 2011/0066497 | A1* | 3/2011 | Gopinath | G06Q 30/02 705/14.53 |
| 2013/0138436 | A1* | 5/2013 | Yu | G06N 3/04 704/232 |
| 2014/0089232 | A1* | 3/2014 | Buibas | G06N 3/049 706/11 |
| 2014/0136362 | A1* | 5/2014 | Shaya | G06Q 30/02 705/26.7 |

FOREIGN PATENT DOCUMENTS

EP 3001358 A1 * 3/2016 ............... G06N 3/08

OTHER PUBLICATIONS

Using the Representation in a Neural Network's Hidden Layer for Task-Specific Focus of Attention Shumeet Baluja & Dean Pomerleau May 22, 1995 CMU-CS-95-143 School of Computer Science Carnegie Mellon University Pittsburgh, Pennsylvania 15213.*
Using the Representation in a Neural Network's Hidden Layer for Task-Specific Focus of Attention Shumeet Baluja & Dean Pomerleau May 22, 1995 CMU-CS-95-143 School of Computer Science Carnegie Mellon University Pittsburgh, Pennsylvania 15213 (Year: 1995).*

* cited by examiner

*Primary Examiner* — Scott A. Waldron
*Assistant Examiner* — Ababacar Seck
(74) *Attorney, Agent, or Firm* — Knobbe, Martens, Olson & Bear, LLP

(57) ABSTRACT

A system and method is disclosed for predicting user behavior in response to various tasks and or/applications. This system can be a neural network-based joint model. The neural network can include a base neural network portion and one or more task-specific neural network portions. The artificial neural network can be initialized and trained using data from multiple users for multiple tasks and/or applications. This user data can be related to characteristics and behavior, including age, gender, geographic location, purchases, past search history, and customer reviews. Additional task-specific neural network portions can be added to the neural network and may be trained using a task-specific subset of the training data. The joint model can be used to predict user behavior in response to an identified task and/or application. The tasks and/or applications can relate to use of a website by users.

21 Claims, 5 Drawing Sheets

JOINT MODELING OF USER BEHAVIOR

BACKGROUND

Computing devices can be used to model user behavior for a given task and/or application. These models can represent data relationships and patterns, such as functions, algorithms, systems, and the like. The models may accept data input (sometimes referred to as an input vector), and produce output (sometimes referred to as an output vector) that corresponds to the input in some way. In some implementations, a model is used to generate a likelihood or set of likelihoods that the input corresponds to a particular value, e.g., a score. For example, a model may be used to determine what products should be recommended to a customer based on the likelihood that the customer will purchase each product. Different models are used for each individual task and/or application. These models use features specific to each task and/or application.

Numerous types of models may be used for these tasks and/or applications. Artificial neural networks ("NN"), including deep neural networks, are one type of model that can be used for modeling these tasks and/or applications. NN models are useful for solving problems that are difficult to solve using rule-based models, e.g., pattern-recognition, speech processing, face recognition, etc.

Scores in NN-based models are obtained by doing an NN forward pass. The forward pass involves multiplying large trained NN weight matrices, representing the parameters of the model, with vectors corresponding to feature vectors or hidden representations. The NN may progress from lower level structures to higher level structures. For example, for a NN trained to recognize faces in images, the input of the NN can comprise pixels. A lower level of the NN may recognize pixel edges, a higher level may identify parts of objects, such as eyes, noses, ears, etc., and an even higher level may recognize a face (or other object).

The parameters of a model can be set in a process referred to as training. A model can be trained using customer data that includes input data and the correct or preferred output of the model for the corresponding input data. The model can be used to process the input data, and the parameters of the model can be modified until the model produces (or "converges" on) the correct or preferred output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
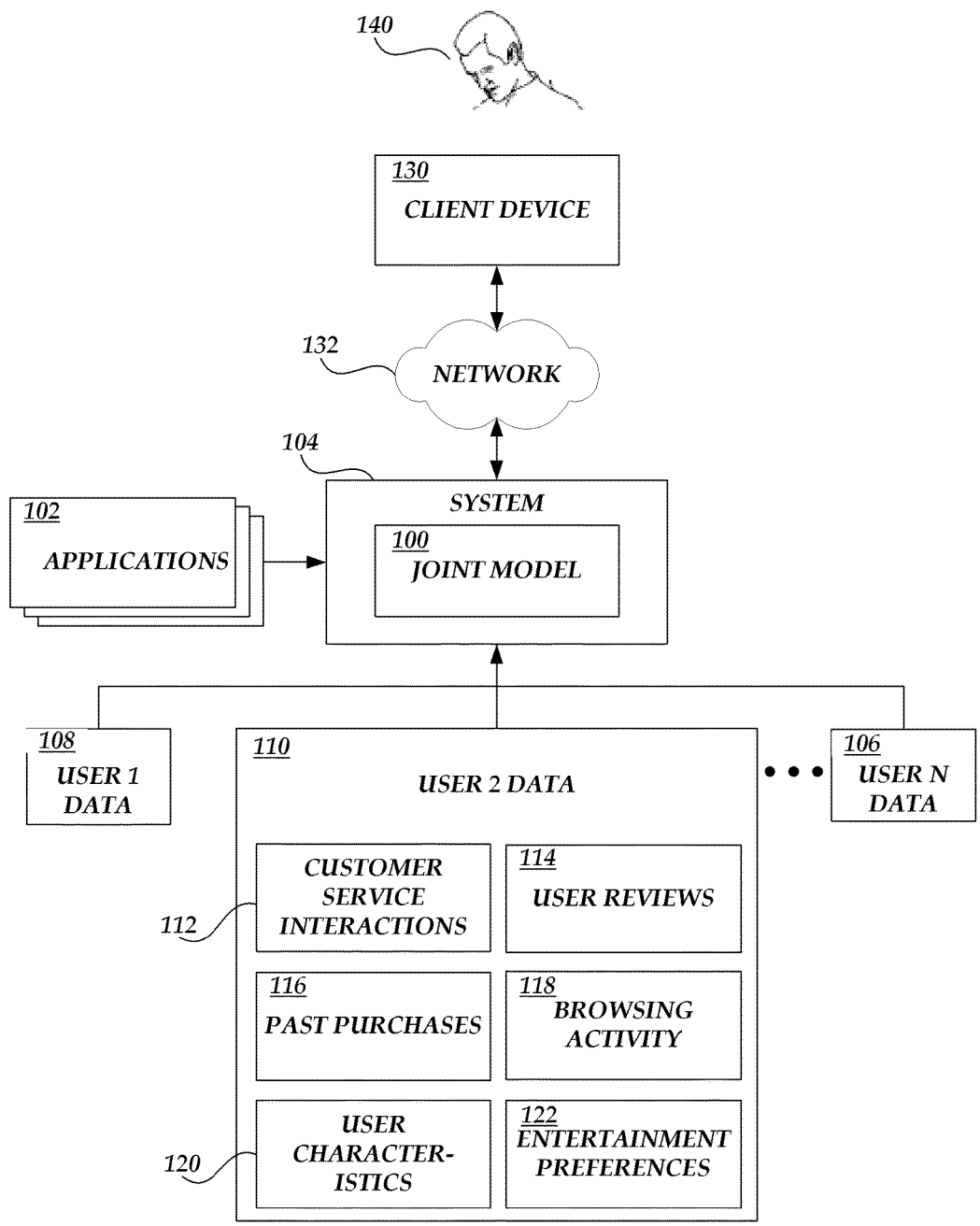
FIG. 1 is a block diagram of an illustrative networked environment containing a trained NN-based joint model for predicting user behavior, and shows illustrative interactions between a specific user, a client device, and a system containing the NN-based joint model.

The present disclosure is directed to utilizing a unified neural network to jointly model related tasks and/or applications. Although the unified neural network described herein may be applied to many different types of tasks and/or applications, for clarity of illustration, the examples herein will refer to user data and behavior and tasks and/or applications relating to use of a website by users. Generally described, the joint model may use an artificial neural network, also referred to herein as a neural network for convenience. A neural network is a network containing at least one computational unit, also known as a neuron or node, interconnected to other computational units. Conceptually, the nodes may be thought of as calculating the output values as a function of a plurality of different input values. Typically, neural networks have multiple (e.g., two or more) layers of nodes. Nodes of adjacent layers may be connected to each other. Each connection between the various nodes of adjacent layers may be associated with a respective weight. Weights are parameters that manipulate the data in the calculations between layers. When processing data input in the form of a vector (e.g., one or more feature vectors containing information extracted from portions of the available data), a neural network may first multiply each input vector by a matrix representing the weights associated with connections between the input layer and a subsequent layer.

A neural network, including, for example, a deep neural network, utilized in a model may contain several layers. These layers include an input layer, an output layer, and several hidden layers. The hidden layers can be non-linear. The neural network may be used to model, for example, a user's behavior, such as the behavior of a specific customer or consumer on a website. In modeling user behavior, the input stage may consist of a set of parameters (e.g., a feature vector) for a given user along with parameters for a specific product. Scores may be obtained by doing a forward pass. The forward pass involves multiplying matrices representing the connection weights between nodes of adjacent layers by vectors corresponding to one or more feature vectors (from the input layer) or hidden representations (from the subsequent hidden layers). In some cases, hidden layers and/or the output layer may include thousands of nodes.

A neural network is effective at learning how to solve a task. The neural network can be presented with a set of observations as well as a specific task to solve. The neural network may determine the solution with the smallest possible cost. The cost represents how far the given solution is from the preferred output, e.g., truth, of the task to be solved. The weights between layers of the neural network can be adjusted such that the output of the neural network is similar to the preferred output.

One problem with using individual models for each specific task is that the data may be sparse for a given task. Building an NN-based joint model that uses data from multiple users across multiple tasks can remedy this issue. For example, a system containing the NN-based joint model can have data sets from three separate users for three separate tasks. The system may not have a data set for one of these users for one of these tasks. The system can use the NN-based joint model to predict how a user would behave based on how the user has reacted for the other two tasks, as well as or alternatively, based on how other similar and dissimilar users have reacted for the specific task. If individual models were used for each specific task, no such predictions could be used. The use of the same data features across multiple tasks and/or applications can also reduce noise from the data set as well as reduce uncertainty regarding the data results.

A single neural network, e.g., the NN-based joint model, can be constructed and used to predict user behavior for a variety of tasks and/or applications. The lower levels of the NN are task independent. As a result, these levels can be trained and used for multiple tasks and/or applications. Using the same joint model for multiple tasks and/or applications can improve accuracy regarding the joint model's predictions of user behavior. For example, a system containing the NN-based joint model may acquire data sets from multiple different users who gave different reviews to different products. The system can additionally have data sets regarding the kinds of products the different users purchased. The NN-based joint model can determine if there is a correlation between the types of reviews given for different products and the types of products a user ultimately purchases. If two users give similar kinds of reviews for different kinds of products, the NN-based joint model can further determine whether the two users have anything in common, e.g., similar requirements for a product, design preferences in a product, etc. In some embodiments, the training data can be associated with customers of an electronic commerce website. For example, the electronic commerce website can allow customers to shop online.

In the above example, the NN-based joint model is used to determine what kinds of products should be recommended to different users. The NN-based joint model may discover patterns or commonalities for other tasks and/or applications. For example, the NN-based joint model may determine that the same kinds of products should be recommended for certain types of users. The NN-based joint model can use some of the same sets of data to determine what type of targeted advertising should be provided for different users. The system containing the NN-based joint model can use the same data to determine user behavior across a multitude of different tasks and/or applications.

In order to predict how users may respond, the system containing the NN-based joint model can acquire data about multiple users, e.g., customer data. This data can be training data. For example, the system can learn specific user characteristics, such as each user's age, gender, income, spending levels, geographic location, ethnicity, religion, other demographic information, etc. This data can then be used to train the initial neural network. In one embodiment, the NN-based joint model can cluster users with similar characteristics. In another example, the NN-based joint model can determine correlations between users based on their characteristics. The system can acquire additional types of data for different tasks and/or applications. For example, the system can obtain user browsing history, past user purchases, user product reviews, etc. The system can then provide the NN-based joint model with the data sets so that the NN-based joint model can determine what types of data are relevant to a given task.

Similarly, the system can gather data about different types of products. For example, the system can gather data about products with which the user interacts, e.g., watching movies on a computing device, reading electronic books on an e-reader, etc. The system can gather information on other types of products, such as products that the user purchases, e.g., clothes, toiletries, movies, books, household items, etc. Data about these products can also be used to train the NN-based joint model.

In some embodiments, a neural network may be generated and trained for one or more core tasks and/or applications such as product recommendation and targeted advertising. The neural network can consist of a base neural network portion and a task-specific neural network portion. The base neural network portion can include the input layer and one or more hidden layers. These layers may be low-level features of the system. The low-level features of the system may be common across multiple tasks and/or applications as they are task-independent, e.g., the lower levels can correspond to common ways of representing customers, common ways of representing products, etc. The neural network can be trained using a shared base neural network portion common to all tasks and/or applications. The neural network can branch out for the task-specific portion, comprising at least the output layer. The task-specific portion can include hidden layers as well, but may consist of just the output layer. These higher level layers are specific to a given task and/or application, e.g., product recommendations versus targeted advertising. The trained base neural network portion can be shared across all tasks and/or applications.

In some embodiments, the NN-based joint model can be generated and trained for one or more core tasks and/or applications. The base neural network portion can be embedded for various input vectors. The output of the base neural network portion can be record for each input vector. This output can be used as an input to task-specific neural networks. This can significantly decrease the computational resources needed to predict user behavior for a given task and/or application, as the value from the base neural network portion has already been determined.

In some embodiments, the initial neural network can be initialized and trained using the customer data associated with multiple users. The artificial neural network can contain an input layer, one or more hidden layers, and an output layer. The initial neural network can be common across all tasks and/or applications. In some embodiments, the initial neural network can be represented by a base neural network portion and a task-specific neural network portion. The task-specific neural network portion can be replaced by a different task-specific neural network portion corresponding to a different task. The task-specific neural network portion can vary in size. For some tasks, only the output layer of the initial neural network is replaced. For other tasks, the output layer plus one or more hidden layers may be replaced with a new task-specific portion.

Each individual user and/or product can be represented by a different input, or vector. These vectors can be generated by the NN-based joint model. These inputs can be specific to a given user but may be task-independent rather than specific to a given task and/or application. As a result, these inputs can be used by the NN-based joint model regardless of the task and/or application at hand. Different tasks and/or applications can be trained on the NN-based joint model using the same input vectors. Outputs from the NN-based joint model can correspond to information such as: determining the likelihood that a specific user is interested in a specific product; determining the likelihood that the user would return the product after purchase; determining the likelihood that the user will click on a specific advertisement, etc. These inputs are processed using the neural network and are output transformed as output vectors. For example, if the system containing the NN-based joint model has information on three thousand different products, the NN-based joint model can output scores for each of these three thousand products. The scores can include a ranking of the three thousand products based on how likely it is that a specific user would purchase each product. In another example, the NN-based joint model can determine the likelihood that a specific user selects a given link or advertisement.

Although the examples and embodiments described herein will focus, for the purpose of illustration, on NN-based joint modeling for use in modeling user behavior and tasks and/or applications related to use of a website by users, one skilled in the art will appreciate that the techniques described herein may be applied to other processes, methods, or systems. For example, the techniques may be used with any type of neural network, for neural networks used for purposes other than modeling user behavior, such as automatic speech recognition, etc. Various aspects of the disclosure will now be described with regard to certain examples and embodiments, which are intended to illustrate but not limit the disclosure.

Sample Environment for Implementing a Neural Network-Based Joint Model

FIG. 1 illustrates an example environment in which a trained NN-based joint model may be implemented. It depicts a system 104 containing the NN-based joint model 100, as well as a client device 130 and a specific user 140. The joint model 100 can be contained in the network-accessible system 104 in communication with the client device 130 via a communication network 132, such as a cellular telephone network or the internet. A user 140 may use the client device 130 to browse online, read, watch movies, submit utterances, receive information, and initiate various processes. For example, the user 140 can use the client device 130 for online shopping.

The client device 130 can correspond to a wide variety of electronic devices. In some embodiments, the client device 130 may be a mobile device that includes one or more processors and a memory which may contain software applications executed by the processors. The client device 130 can include a touchscreen or other interface component to allow the user 140 to interact with the client device 130. The client device 130 may include a speaker or other audio output component for presenting or facilitating presentation of audio content. In addition, the client device 130 may contain a microphone or other audio component for accepting speech input. Illustratively, the client device 130 may include any computing devices such as wireless mobile devices (e.g. smart phones, PDAs, tablets, or the like), desktops, laptops, media player, video game platforms, electronic book readers, television set-top boxes, televisions (e.g., internet TVs), and computerized appliances, to name a few. The software of the client device 130 may include components for establishing communications over wireless communication networks or directly with other computing devices.

The trained NN-based joint model 100 can be contained on any computing system 104 that is configured to communicate via a communication network. For example, the system 104 can contain any number of server computing devices, desktop computing devices, mainframe computers, and the like. In some embodiments, the system 104 can include several devices physically or logically grouped together, such as an application server computer device configured to predict how a specific user may behave and a database server computing device configured to store user data for multiple users and/or products.

The system 104 can include the NN-based joint model 100, one or more applications 102, and data from multiple users 106, 108, 110 across multiple tasks and/or applications 102. While this illustrative example shows data from user 1, user 2, and user N, 106, 108, 110 being fed into the system 104, the actual data sets can comprise data from hundred, thousands, and millions of different users. Each of these users is associated with data 106, 108, 110 related to specific characteristics of these users.

In some embodiments, the system 104 can include various models and components combined on a single device, multiple instances of a single model or component, etc. For example, the system 104 may include a separate database server that may be configured with a data store containing user data 106, 108, 110 from multiple different users; a server or group of servers configured with the NN-based joint model 100; and a server or group of servers configured with applications 102. In multi-device implementations, the various devices of the system 104 may communicate via an internal communication network, such as a corporate or university network configured as a local area network ("LAN") or a wide area network ("WAN"). In some cases, the devices of the system 104 may communicate over an external network, such as the Internet, or a combination of internal and external networks.

In some embodiments, the features and services provided by the system 104 may be implemented as web services consumable via a communication network 132. In further embodiments, the system 104 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 132 may be a publicly accessible network of linked networks, possibly operated by various distinct parties, such as the Internet. In other embodiments, the network 132 may include a private network, personal area network ("PAN"), LAN, WAN, cable network, satellite network, etc. or some combination thereof, each with access to and/or from the Internet. For example, the devices of the system 104 may be located within a single data center, and may communicate via a private network as described above. The client device 130 may communicate with the system 104 via the Internet. The client device 130 may have access to the Internet via a wired or WiFi connection, or via a cellular telephone network (e.g., a Long Term Evolution or LTE network).

The NN-based joint model 100 shown in FIG. 1 is trained on data from multiple users, such as 106, 108, 110, across multiple tasks and/or applications 102. FIG. 1 shows data from users 106, 108, 110. The system 104 can gather data from any number, N, of users. For this illustrative example, data from one user 110 corresponds to the data collected regarding the specific user 140. The data can include user characteristics 120 specific to each user 106, 108, 110. For example, the system 104 may have collected user characteristic data 120 regarding user 140's age, gender, income, spending levels, geographic location, ethnicity, religion, other demographic information, etc. The system may have similarly collected user characteristic data as part of the data for 106, 108. The neural network 100 may be applied to many different types of tasks and/or applications. However, for clarity of illustration, the examples herein will refer to user data and behavior and tasks and/or applications relating to use of a website by users.

The data 106, 108, 110 can include information about various tasks and/or applications 102. This information can be specific to a user 140. The system 104 can collect data 112 regarding the customer service interactions between a specific user 140 and a product provider. For example, the specific user 140 may have previously complained about the purchase of a product. The system 104 is aware that the customer 140 has previously expressed disapproval about the specific product, and that the customer 140 may require additional care if calling about the same product in the future. The system 104 can contain data 114 regarding reviews that each specific user 140 has made. The system 104 can contain data 116 regarding past purchases or returns that each specific user 140 has made. The system 104 can contain data 118 regarding the browsing history of each specific user 140. For example, a specific user 140 may have frequently visited the product page for a product available online, such as a pair of shoes, but has not yet purchased the product. The system 104 knows from the user's browsing activity 118 and past purchases 116 that the user 140 has not yet purchased the product but is likely interested in the product. The system 104 can collect data 122 regarding the entertainment habits and/or preferences of each specific user 140. For example, the a user 140 can have downloaded books to read on the client device 130, or streamed movies or television shows to watch on the client device 130. The system 104 may have similar data collected for other users, such as data 106, 108. All of this data can be used as training data for the initial neural network.

The system 104 may only have data for some of these situations for a specific user 140. The NN-based joint model 100 may be able to predict the behavior of the user 140 based on what users with similar characteristics have done. The NN-based joint model 100 may alternatively be able to predict the behavior of the user 140 based on what the user 140 has done in similar situations. The NN-based joint model 100 may alternatively be able to predict what a general user would do for a task on which the NN-based joint model 100 has not been trained. The system 104 can generate content in response to the predictions of the NN-based joint model 100. The content can be an electronic commerce parameter. For example, an electronic commerce parameter can be a targeted advertisement, one or more product recommendations, price adjustment based on the pricing sensitivity of a user, etc. The system 104 can present the generated content to the user 140. For example, the NN-based joint model 100 may predict that a particular user 140 is likely to purchase a product at a ten-percent discount. The system 104 can generate the new price for the product and transmit the price to the client device 130. The client device 130 can then present the user 140 with the adjusted price.

The NN-based joint model 100 can be used to predict user behavior for a specific task and/or application 102. For example, the NN-based joint model 100 can be used to predict what related products should be shown to user 140 who is online shopping using client device 130. In another example, the NN-based joint model 100 can be used to predict how much the price of a given product must drop before the customer 140 elects to purchase the item. The same NN-based joint model 100 is used for all these tasks and/or applications 102. The NN-based joint model 100 can output one or more likely responses for a given task and/or application 102. For example, the joint model 100 may output a lattice or N-best list of likely responses. In some embodiments, the lattice or N-best list may include scores indicating a confidence in each part of the response.

Various tasks and/or applications, such as the applications 102 of FIG. 1, can use the output of the joint model 100 to respond to user action or take actions regarding customer behavior. Separate tasks and/or applications 102 may be implemented within the system 104 to perform differently based on the output of the joint model 100. For example, the system 100 may include separate applications 102 for playing music, providing directions, performing searches, purchasing products, providing personal information management (e.g., calendars or contacts) and the like.

Generating a Trained Neural Network-Based Joint Model

Figure 2:
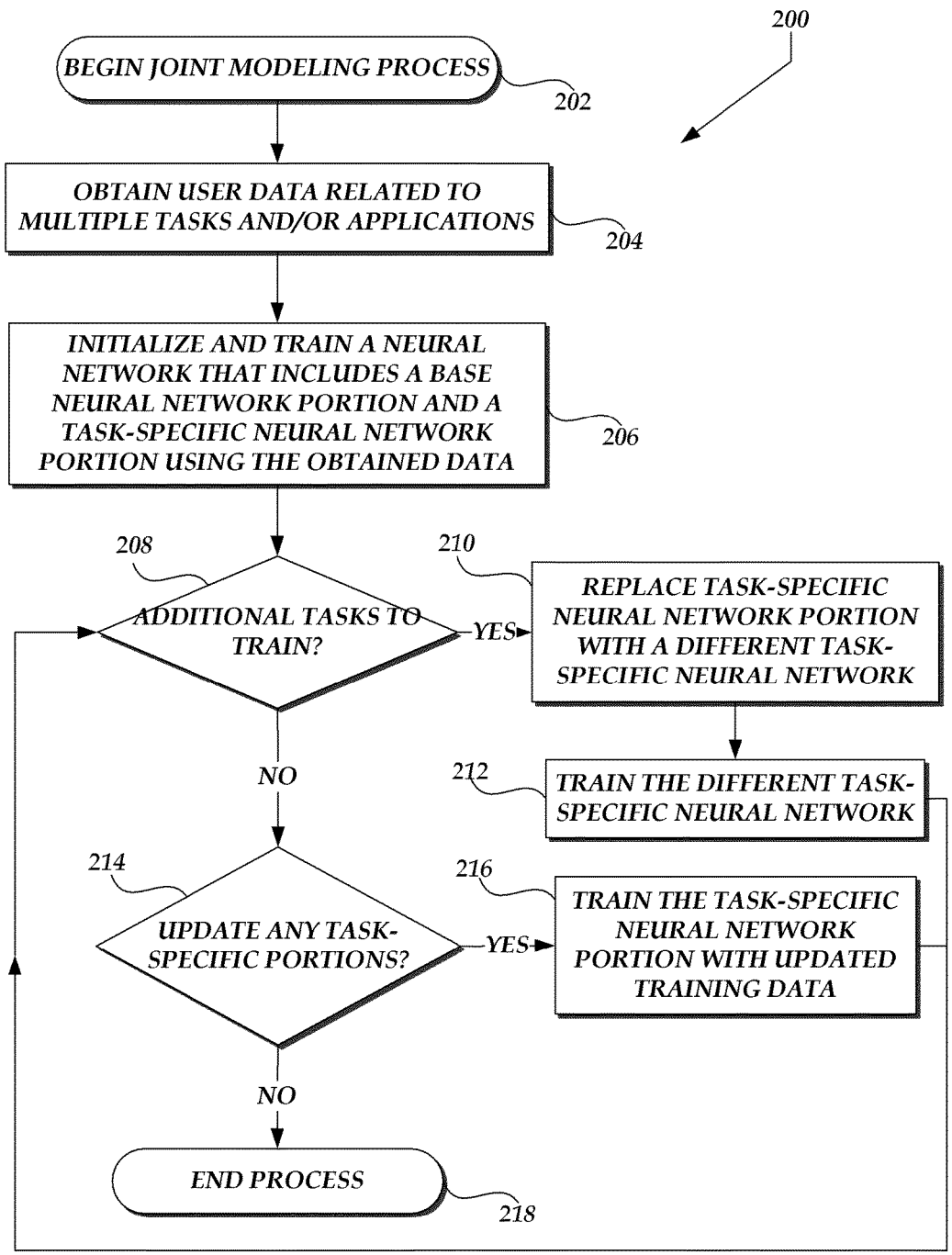
FIG. 2 is a flow diagram of an illustrative process for initializing and training the NN-based joint model for various tasks and/or applications.

The joint model can be represented by an artificial neural network, including a deep neural network. FIG. 2 depicts an illustrative process 200 for generating and training the NN-based joint model 100. In some embodiments, the NN-based joint model 100 is a model used to predict user behavior. The process 200 involves gathering data from multiple users for multiple tasks and/or applications. The neural network 100 may be applied to many different types of tasks and/or applications. However, for clarity of illustration, the examples herein will refer to user data and behavior and tasks and/or applications relating to use of a website by users.

The joint modeling process 200 begins at block 202. The process 200 may be embodied in a set of executable program instructions stored on a computer-readable medium, such as one or more disk drives, of a computer system. When the process 200 is initiated, the executable program instructions can be loaded into memory, such as RAM, and executed by one or more processors of the computing system.

Block 204 involves obtaining user and task and/or application data. This may involve the gathering of data from multiple users. The data can be used across multiple tasks and/or applications. As described above, the system 104 may collect data including characteristics about users. For example, the system 104 can collect data regarding users' ages, genders, incomes, geographic locations, ethnicities, religions, etc. The system 104 can also collect data on different behaviors of multiple users. This data can relate to multiple tasks and/or applications. For example, the system 104 may collect data regarding multiple users' browsing history, entertainment, customer service interactions, user reviews, and past purchases. This data can be used as training data. In some embodiments, the training data is associated with one or more customers of an electronic commerce website. For example, the training data may relate to a company that provides customers with online shopping websites.

This data may demonstrate a specific user's pricing sensitivity, the type of products a user likes to purchase, products the user has disliked, what type of user interface a user prefers on his or her client device, etc. For example, a given user may only buy products when the price is discounted by twenty-five percent. Another user may spend additional time online shopping on his or her client device when presented with a user interface containing an orange color scheme and a minimalist design.

Block 206 involves initializing and training the joint model 100 based on said user and task and/or application data. The process can involve initializing an initial neural network. The NN-based joint model 100 is an artificial neural network, including a deep neural network. The NN-based joint model 100 can be useful when solving tasks that do not behave according to simple rules, for example, predicting user sensitivity to shifting product pricing. When the joint model 100 is first generated, the initial weights of the layers in the neural network can be randomly assigned. In some embodiments, the joint model 100 can include information relating to single task models.

The NN-based joint model 100 can extrapolate trends and predictions from the data with which it is presented. In one illustrative example, the joint model 100 can have data regarding three specific tasks, A, B, and C. The joint model 100 can also have data regarding three specific users, 1, 2, and 3. Specifically, the joint model 100 can have data regarding how users 1 and 2 respond similarly to task A, how users 2 and 3 respond similarly to task B, and how users 1 and 3 respond similarly to task C. The joint model 100 may not, in this example, have information regarding how user 3 responds to task A, how user 1 responds to task B, and how user 2 responds to task C. Nonetheless, the joint model 100 can use the other data it has to predict how each user would respond in these situations based on how the users have behaved for other tasks and how other similar users have behaved for the same task. The NN-based joint model 100 contains an input layer and output layer, any number of hidden layers, and various weights connecting the nodes contained within the layers. The NN-based joint model 100 can contain a base neural network portion and a task-specific neural network portion. The base neural network portion can include the input layer and one or more hidden layers. The task-specific neural network portion can include the output layer. In some embodiments, the task-specific neural network portion can include one or more hidden layers in addition to the output layer. The task-specific neural network portion can vary in size depending on the task.

Training the NN-based joint model 100 can involve, for example, using the user data from multiple users related to multiple tasks and/or applications. When training the initial artificial neural network, the output from the joint model 100 can be compared to some known output. The joint model 100 can then be adjusted if necessary. This adjustment can involve using the NN-based joint model 100 to predict a specific user's behavior for a given task and/or application when the user's behavior is already known, e.g., there is a known truth with which to compare the output of the joint model 100. If the NN-based joint model 100 output is not similar to the desired output, the model 100 can be adjusted such that the output is closer to the truth. This adjustment process can be repeated until the joint model 100 is trained. The same sets of data can be processed repeatedly by the joint model 100 during training. The initial neural network can be trained for multiple tasks and/or applications.

This process can be an iterative learning process. Data sets can be presented to the joint model 100 one at a time. Errors can be propagated back through the joint model 100 such that the weights are adjusted between the layers. The weights associated with the input values can be adjusted for each trial. The joint model 100 can determine which input contributes the most to the incorrect output and adjust the weights related to that input in order to correct the error. Eventually, the NN-based joint model 100 can predict the correct behavior of the input samples. This training process can be known as feedforward back-propagation. The joint model 100 is presented with large amounts of data during training. The data can be noisy. NN-based models have a high tolerance for noisy data and can still extrapolate solutions for a given task and/or application. In some embodiments, the joint model 100 can be trained for several key applications, such as product recommendation, targeted advertising, and price sensitivity.

Block 208 involves determining whether the neural network should be trained for additional tasks. If the joint model 100 does not need to be trained with additional tasks, the process can move to block 214. There, the system can determine whether to update any task-specific portions of the neural network.

If the joint model 100 determines that it should update any task-specific portions of the neural network with additional data, this update can occur at block 216. This update can involve training the task-specific portions of the joint model 100 using additional data gathered from user-system interactions, additional information about one or more users, additional users, additional products, etc. The base portion of the joint model 100 may not be updated. In some embodiments, the entire neural network 100, including both the base portion and the task-specific portion, can be updated with additional information. This may happen infrequently as updating the entire neural network 100 with additional data can require a great deal of computation.

If the process instead involves a determination that the joint model should be trained for additional tasks, the task-specific portion of the neural network is replaced with a different task-specific neural network corresponding to a task on which the joint model 100 has not been trained at block 210. The different task-specific neural network can include an output layer. In some embodiments, the different task-specific neural network can include one or more hidden layers in addition to the output layer. The portion of the neural network that is replaced with a different task-specific neural network portion can vary depending on the task. For example, if the joint model 100 has been trained for product recommendation and is now being trained for price sensitivity, the task-specific portion that is replaced may include the output layer and no hidden layers. However, if the joint model 100 has been trained for product recommendation and is now being trained for targeted advertising, the task-specific portion that is being replaced may include the output layer plus two hidden layers. These examples are intended for illustrative purposes only and are not limiting. The base neural network portion can vary in the number of hidden layers, but is used across all tasks and/or applications.

Once the task-specific portion of the neural network has been replaced with a different task-specific neural network, the different task-specific neural network can be trained. This training, performed at block 212, can be in addition to the initial neural network training performed at block 206. The task-specific portion of the neural network can be trained using the obtained data regarding users, products, and tasks and/or applications. When training the task-specific portion of the neural network, the output from the joint model 100 can be compared to some known output. The weights in the task-specific portion of the neural network can then be adjusted if necessary. This adjustment process can be repeated until the task-specific portion of the neural network is trained for the corresponding task and/or applications. For example, the newly trained joint model 100 can now be used to predict what products a customer would purchase. The original joint model 100 may instead have been trained to predict which user interface a user would prefer. By replacing the task-specific portion of the neural network with a different task-specific neural network portion, the joint model 100 can be trained as needed for a specific task, such as automatic speech recognition. The process then circles back to block 208, where the system determines whether the joint model 100 should be trained on additional tasks and/or applications.

The process ends at block 218.

Figure 3:
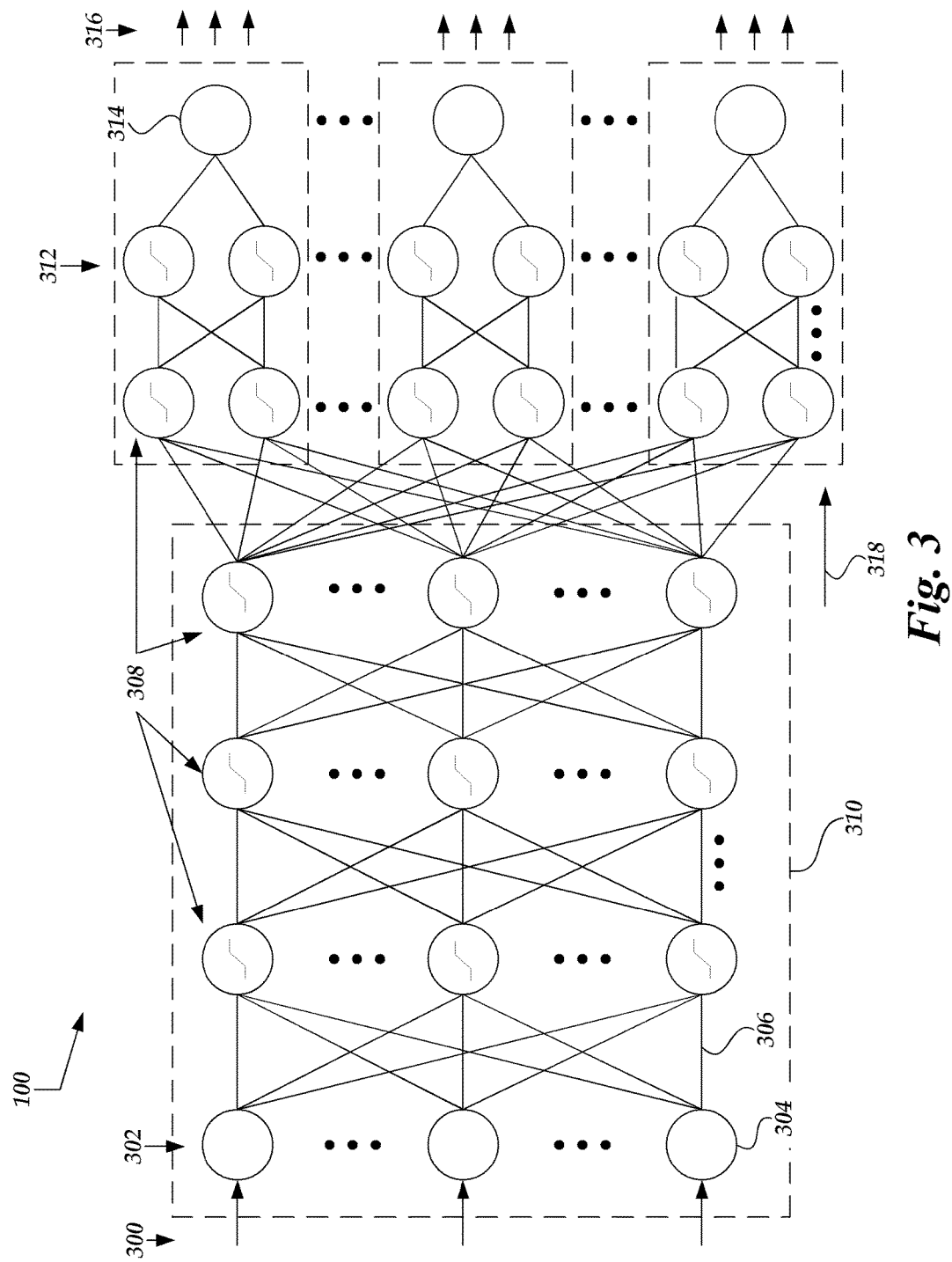
FIG. 3 is a block diagram of an illustrative NN-based joint model wherein the NN-based joint model includes a base neural network portion and one or more task-specific neural network portions.
Figure 4:
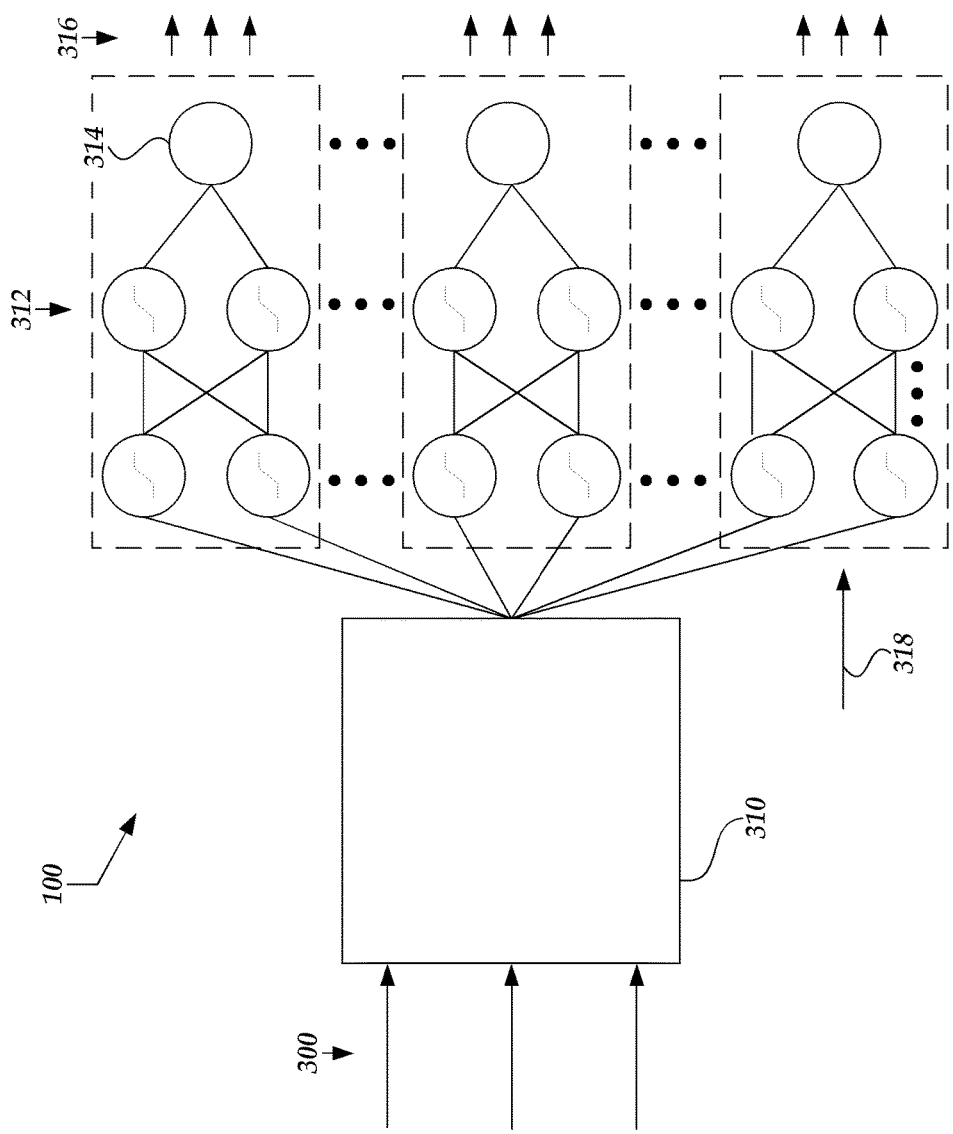
FIG. 4 is a block diagram of another embodiment of an illustrative NN-based joint model wherein data is embedded into the NN.

Sample Neural Networks with Certain Components Trained for all Tasks and/or Applications As mentioned above, the joint model 100 can be represented by an artificial neural network, including a deep neural network. FIG. 3 and FIG. 4 depict an illustrative neural network-based joint model 100 containing several non-linear hidden layers 308, a base neural network portion 310, and one or more task-specific neural network portions 312. Input features 300 can be fed into the joint model 100. These features 300 can relate to different users or products. The features 300 can be constructed from data related to the users or products. The data can be related to multiple tasks and/or applications. The input vectors 300 can be customer identifiers that serve to identify the customer but do not convey any additional data about the customer, such as browsing history, age, geographic location, etc.

The joint model 100 contains an input layer 302 that corresponds to a set of input vectors or feature vectors 300. In one embodiment, the input vectors 300 may consist of a set of parameters representing a specific customer. The input vectors 300 may further consist of parameters for a particular product. Each layer of the joint model 100 can contain a set of nodes 304. Each node 304 is a computational unit interconnected to other computational units within the joint model 100.

The input layer 302 can contain a different number of nodes 304 from the hidden layers 308 or the output layer 314. For example, the input layer 302 may contain one hundred nodes 304 while the output layer 314 may contain one thousand nodes 304. Several hidden layers 308 are contained in the joint model 100. The hidden layers 308 can be non-linear. The number of hidden layers 308 can be any number. Each hidden layer within the NN-based joint model 100 can consist of any number of nodes 304.

These data inputs 300 are processed using the joint model 100 and are output transformed as output vectors 316. The output layer 314 may consist of a set of nodes 304. The output layer 314, though shown as one output, can contain multiple outputs from multiple nodes 304. The nodes 304 can receive a number of input signals. Each node 304 has a number of input signals coming into it. Each of these input signals is assigned a relative weight 306 for that node 304. The output signal from the node 304 can be fanned out to act as inputs to a number of other nodes 304.

Based on these inputs, the nodes 304 can either generate an output signal or generate no output signal. The weights 306 between the layers can be adjusted to determine whether a node 304 will produce an output signal. For example, each set of nodes 304 can be associated with a respective task and/or application (e.g., recommending products to a user, determining how much the price of a product must drop before the specific user will purchase the product, what user interface design is most likely to appeal to the specific user, etc.). The output layer 314 indicates how a particular user will behave. The output layer 314 may be linear or non-linear.

The NN-based joint model 100 may be supervised when learning. For example, the NN-based joint model 100 may learn functions from the input to the output. These functions can be based on example input and output vector pairs. In one specific embodiment, the input comprises a data representation of a specific user. The data may include user characteristics. The user characteristics can include characteristics such as the user's age, gender, geographic location, income, race, marital status, and religion. Data for other users can be used when training the joint model. The data can be collected for multiple users, such as the users' customer service interactions, user reviews, entertainment, browsing history, and past purchases. The information for each individual user may be compiled such that the joint model 100 contains information for multiple users across multiple tasks. In another embodiment, the joint model 100 may be unsupervised when learning. In such a situation, the joint model 100 has no knowledge of the preferred output or truth, and does not know exactly what the correct response should be. The training data can involve multiple users and multiple applications. In some embodiments, the training data is associated with customers of an electronic commerce website.

The NN-based joint model 100 can include a base neural network portion 310 and a task-specific neural network portion 312. The base neural network portion 310 can include the input layer and one or more hidden layers. The task-specific neural network portion 312 can include the output layer. In some embodiments, the task-specific neural network portion 312 may contain one or more hidden layers. While FIG. 3 depicts a task-specific neural network portion 312 containing two hidden layers 308 and an output layer 314, this figure is illustrative and not limiting. The base neural network 310 contains those lower layers of the neural network that are common across multiple tasks and applications, e.g., are task and/or application-independent. For example, the low-level layers making up the base neural network portion 310 can relate to identifying and clustering different user characteristics. The high-level layers 312 can relate to specific tasks and/or applications. The joint model 100 may be trained for at least one task and/or application.

The task-specific portion 312 of the neural network can be replaced by a different task specific-portion 312. This different task-specific portion can correspond to a different task. For example, the joint model 100 can be trained for product recommendation. The task-specific portion 312 of the neural network can be replaced by a task-specific portion 300 corresponding to a new task, such as targeted advertising. The new task-specific portion 312 can be trained for this new task. This new task-specific portion 312 can be trained using a subset of the training data. The subset of the training data can be task-specific. As a result, the joint model 100 can easily be adjusted for specific tasks and/or applications without affecting the base neural network portion 310 shared across all tasks and/or applications. The base neural network portion 310 and the task-specific neural network portion 318 can vary in size depending on the applications. For example, the joint model 100 can be trained for product recommendation. The original task-specific portion 312, comprising, e.g., one hidden layer 308 and an output layer 314, can be replaced by a new task-specific portion 312 and trained for pricing sensitivity. In another example, the joint model 100 can be trained for product recommendation. The original task-specific portion 312, comprising, e.g., an output layer 314, can be replaced by a new task-specific portion 312 and trained for targeted advertising. The number of layers in the task-specific portion 312 can vary from task to task.

In some embodiments, the joint model 100 can be trained for certain important tasks and/or applications like product recommendation or speech recognition. The joint model 100 can be further trained for additional tasks and/or applications. In some embodiments, the joint model 100 may be adjusted to predict user behavior for a task and/or application that was not known or relevant at the time the joint model 100 was initially generated and trained. In some embodiments, the task-specific portion 312 have one or more additional inputs 318 separate from the base neural network portion 310. The additional inputs 318 may be specific to a given task and/or application. The task-specific portions 312 may be updated with additional data as needed. The whole neural network, including the base neural network portion 310 can be updated with additional data as needed. However, this may happen less frequently as updating the base neural network portion 310 requires retraining all task-specific portions 312 that utilize the base neural network portion 310.

FIG. 4 depicts another illustrative example of how a neural network 100 with task-specific layers 312 can be implemented. FIG. 4 is similar to FIG. 3, and depicts a neural network 100 containing embedded data. The outputs of various input vectors can be calculated using the base neural network model. These outputs can be recorded, for example, in a table. When utilizing the joint model 100 to predict user behavior in response to various tasks and/or applications, computation time can be significantly reduced by using the embedded data.

The system may take the output from the base neural network 310. The system can then input this output into a task-specific portion 312 of the neural network 100. As a result, the system need only calculate outputs for the task-specific portion of the neural network 100. The system may additionally input some input 318 that does not come from the base neural network portion 310. This input 318 may be specific to a given task and/or application. Having different task-specific portions 312 of the neural network 100 can be particularly useful when predicting user behavior from a wide variety of data. For example, a company can have different departments, e.g., an advertising department, customer relations department, department for reading e-books, department for streaming instant video, etc. Each department can use the same joint model 100 generated by the company to predict customer behavior. Each department can use the same base neural network portion 310. Each department can then add a task-specific portion 312 suitable for the desired tasks and/or applications that department engages in. The task-specific portion 310 for one department may not be relevant to other tasks and/or applications, which may have other task-specific portions 310.

These examples are intended to be illustrative and not limiting. The above neural network 100 can be used for many different types of tasks and/or applications. For clarity of illustration, the above examples have related to user data and behavior and tasks and/or applications relating to use of a website by users.

Predicting Customer Behavior Using a NN-Based Joint Model

Figure 5:
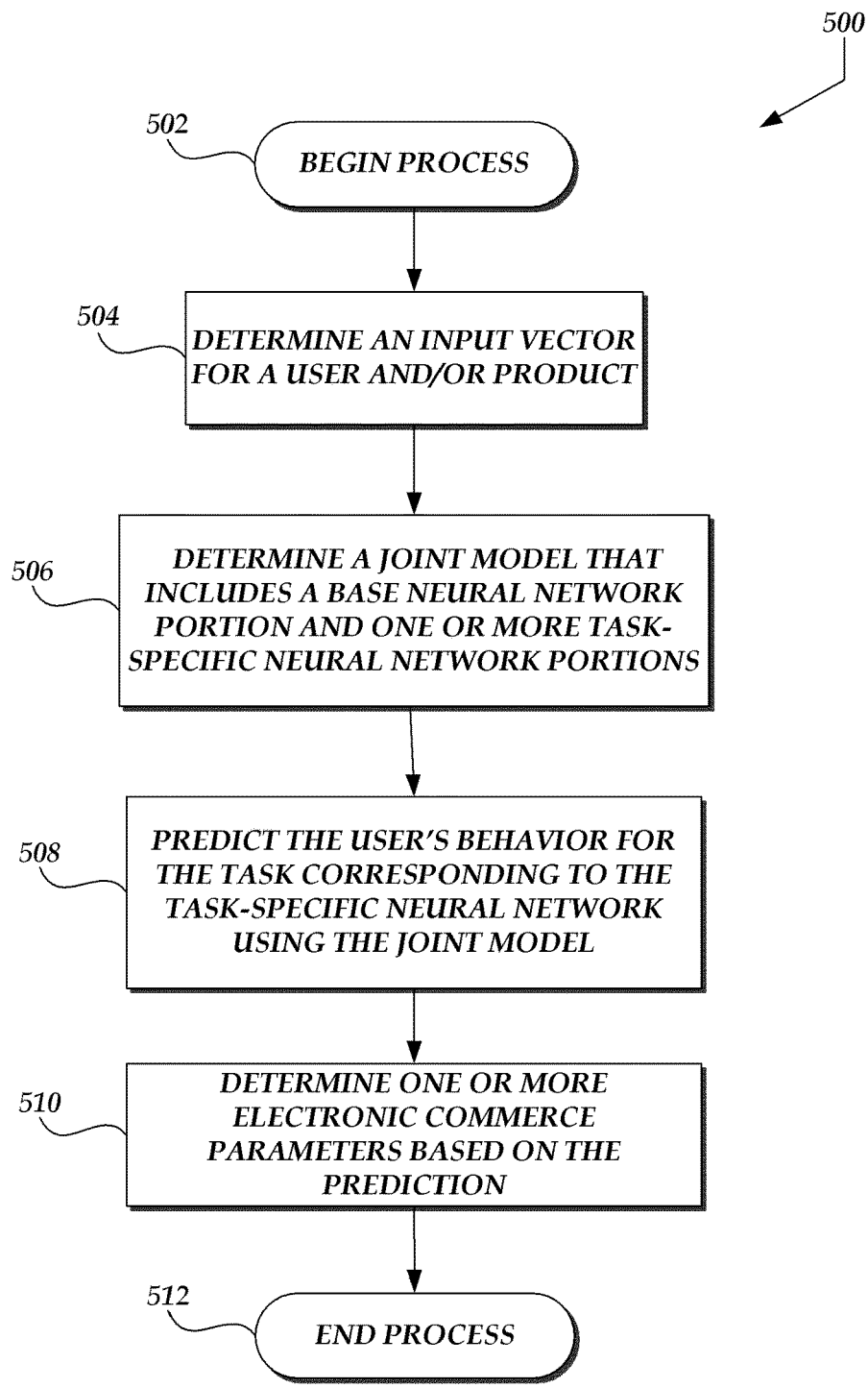
FIG. 5 is a flow diagram of an illustrative process for using the trained NN-based joint model to predict the user's behavior in response to an identified task.

FIG. 5 depicts an illustrative process 500 for predicting user behavior for various tasks and/or applications using the trained NN-based joint model 100. The trained NN-based joint model 100 can be generated using the process described in FIG. 2. As discussed above, the NN-based joint model 100 can be trained using data from multiple users for multiple tasks and/or applications.

The process 500 begins at block 502. The process 500 may be embodied in a set of executable program instructions stored on a computer-readable medium, such as one or more disk drives, of a computer system. When the process 500 is initiated, the executable program instructions can be loaded into memory, such as RAM, and executed by one or more processors of the computing system.

Block 504 involves the system 104 generating one or more inputs for the trained NN-based joint model 100. The input vectors can correspond to some data. For example, the input vectors can represent a specific user. In some embodiments, the input vectors can represent a specific product.

The data representing the user can involve data about the user's characteristics. For example, the data can include the specific customer's age, gender, income, geographic location, ethnicity, religion, etc. In some embodiments, the system 104 has minimal information regarding the specific user. The system 104 may have certain characteristics about the user, e.g., that the user is a man in his forties. The system 104 can compare this user to users with similar characteristics and generate an input for this category of users. The system 104 may simply generate a customer identifier for a user that the system 104 does not know anything about. The system 104 can then gather information related to that user as the user and system 104 continue to interact.

Beyond user characteristics, the system 104 can have other training data regarding user behavior. The other training data can relate to multiple tasks and/or applications. For example, the system 104 may have information regarding past reviews from the user, the user's browsing history, the user's past purchases, etc. The system 104 may use this information to generate a unique vector for each user. In some embodiments, the system 104 can similarly collect information on various products. The system 104 can generate a unique vector for each product as well.

This type of data can have different labels attached to it. For example, for a particular product review made by a user, the system 104 can determine what user generated the review, what product the review was referring to, the particular text of the review indicating that user's sentiment towards the product, etc.

At block 506, the system 104 can determine a joint model 100 that includes a base neural network portion 310 and one or more task-specific neural network portions 312. The joint model 100 may have been previously initialized and trained using the process 200. The task-specific neural network portion 312 can be trained for the specific task and/or application.

Block 508 details using the joint model 100 to generate a prediction of a particular user's behavior in relation to a specific task and/or application. For example, the joint model 100 can predict how likely it is that a particular customer will purchase a particular product. The joint model 100 can produce some output. The system can analyze this output, e.g., a ranked list based on how likely it is that the customer will purchase each of n products out of n available products.

In another example, the joint model 100 can be used to determine how likely it is that a user would click on an advertisement if presented with a specific advertisement. In yet another example, the joint model 100 can be used to determine how likely it is that a specific user, or a group of users with certain shared characteristics, would purchase a product based on changes in the product price. In this example, the output from the joint model 100 can comprise a ranking of price reductions versus likelihood of purchase. In a final example, the joint model 100 can be used to generate search results in response to a specific user's query.

At block 510, the process involves the system 104 determining one or more electronic commerce parameters for an electronic commerce website based on the above prediction. The electronic commerce parameters may relate to the particular user based on the output from block 508. If the joint model 100 is used to determine how likely it is that a particular user would purchase a particular product at a particular price, the process may involve determining what price is most likely to lead to a product purchase while still remaining a profitable transaction for the product vendor. For product recommendations, the system 104 can determine what types of products to show to particular users. For advertisements, the system 104 can determine what advertisements a particular user is likely to select. The system 104 can then generate the content using the electronic marketplace parameters, e.g., create the advertisement, generate a product recommendations tab, calculate a product price.

In some embodiments, the joint model 100 can be used for tasks and/or applications such as determining what color scheme or design scheme a particular user prefers to see when using an application, such as an e-reader. In this embodiment, the system 104 can generate different schemes for individual users. Thus, each user may have an individualized content page for a given application that corresponds to the specific user's preferences.

The generated electronic commerce parameters can be stored in the system. The generated electronic commerce parameters can be displayed or otherwise made available to the user by the system. For example, the system can present the user with generated content corresponding to the electronic commerce parameters. For example, if the user is shopping online using a computing device, the system 104 may generate certain advertisements. The advertisements can be passed to the computing device. The computing device may then present the user with an interface that allows the user to shop while presenting the user with various product recommendations or advertisements targeted for that user. In another example, if an individual user has repeatedly viewed a product but not purchased the product, the user may be presented with a discount on the product in order to motivate the user to purchase the product.

The process ends at block 514.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      obtain first data associated with a set of users of a service, wherein the first data comprises information about activities performed by the set of users through the service;
      train a neural network using a first portion of the first data, wherein the first portion of the first data identifies purchases by a user included in the set of users through the service, and wherein the neural network includes an input layer to receive the first portion of the first data and a first output layer to generate a first metric for the user;
      identify a base portion of the neural network, the base portion comprising: (i) the input layer, and (ii) a first hidden layer, wherein the base portion generates a vector of values representing the user associated with the information received by the input layer;
      identify a first application-specific portion of the neural network, the first application-specific portion comprising: (i) a second hidden layer to receive the vector of values from the base neural network portion, and (ii) the first output layer to generate the first metric for the user;
      replace the first application-specific neural network portion with a second application-specific neural network portion, wherein the second application-specific neural network portion comprises:
      (i) a third hidden layer to receive:
         (a) the vector of values from the base portion, and
         (b) user data for the user from the service, wherein the user data is related to a predicted behavior of the user, and
      (ii) a second output layer to generate a second metric for the user;
      train the second application-specific portion of the neural network using the base portion and a second portion of the first data, wherein the second portion of the first data includes the data related to the predicted behavior of a portion of the set of users, and wherein the portion of the set of users does not include the user;
      receive, from a communication device, a request from the user associated with the second application;
      generate the second metric for the user using the neural network including the second application-specific portion trained using the base portion and the second portion of the first data, wherein the neural network including the second application-specific portion receives at least data for the user of the service and outputs at least the second metric; and
      transmit, to the communication device, a response to the request, wherein the response is generated based at least in part on the second metric for the user.

2. The system of claim 1, wherein the data for the user of the service includes one or more of: user age, gender, income, spending levels, geographic location, ethnicity, or religion.

3. The system of claim 1, wherein the first metric relates to one or more of: product recommendation, targeted advertising, or pricing sensitivity.

4. The system of claim 1, wherein the second metric corresponds to a predicted behavior of the user.

5. The system of claim 4, wherein the processors are further configured to determine one or more website parameters for the user based on the predicted behavior.

6. The system of claim 1, wherein the processors are further configured to replace the first application-specific portion with a third application-specific portion of the neural network related to a third application associated with the service, wherein the third application-specific portion comprises: (i) a fourth hidden layer to receive the vector of values from the base portion and data related to the third application, and (ii) a third output layer to generate a third metric for the third application.

7. A computer-implemented method comprising:
   under control of one or more computing devices configured with specific computer-executable instructions,
      obtaining user data regarding a set of users, wherein the user data comprises information about use of a service by the set of users;
      training a neural network using a first portion of the user data, wherein the first portion of the user data identifies an activity by a user included in the set of users through the service, and wherein the neural network includes: (i) an input layer to receive the first portion of the user data, and (ii) a first output layer to generate a first metric for the user;
      identifying a first application-specific portion of the neural network, wherein the first application-specific portion comprises the first output layer, wherein the first application-specific portion is configured to: (i) receive a vector of values representing the user from a base portion of the neural network, and (ii) generate, from the first output layer, the first metric for the user;
      replacing the first application-specific portion with a second application-specific portion of the neural network, wherein the second application-specific portion is configured to:
      (i) receive:
         (a) the vector of values from the base portion, and
         (b) additional user data for the user from the service, wherein the additional user data is related to a second application, and
      (ii) generate, from a second output layer, a second metric for the user;
      training the second application-specific portion using the base portion and a second portion of the user data, wherein the second portion of the user data includes the user data related to the second application for a portion of the set of users, and wherein the portion of the set of users does not include the user;

receiving, from a communication device, a request from the user associated with the second application;

generating the second metric for the user using the neural network including the second application-specific portion trained using the base portion and the second portion of the first data, wherein the neural network including the second application-specific portion receives at least data for the user of the service and outputs at least the second metric; and transmitting, to the communication device, a response to the request, wherein the response is generated based at least in part on the second metric for the user.

8. The computer-implemented method of claim 7, further comprising training the first application-specific portion using a third portion of the user data, wherein the third portion of the user data differs from the first portion and the second portion.

9. The computer-implemented method of claim 7, wherein the user data includes one or more of: age, gender, income, spending levels, geographic location, ethnicity, or religion.

10. The computer-implemented method of claim 7, further comprising one or more of:

presenting a selected advertisement regarding a particular item to the user based at least in part on the first metric;

setting the price of a product to a particular amount based at least in part on the first metric; or recommending a particular product to the user based at least in part on the first metric.

11. The computer-implemented method of claim 7, wherein the second application comprises determining a likelihood that the user will take a predetermined action.

12. The computer-implemented method of claim 7, wherein the neural network is a deep neural network.

13. The computer-implemented method of claim 7, wherein the first portion of the user data is different from the additional user data related to the second application.

14. One or more non-transitory computer readable media comprising executable code that, when executed, causes one or more computing devices to perform a process comprising:

training a neural network using a first portion of user data, wherein the first portion of the user data identifies an interaction, with a first application of a service, by a user included in a set of users of the service, and wherein the neural network includes an input layer to receive information for the interaction by the user and a first output layer to generate a first metric for the user;

identifying a first portion of the neural network, wherein the first portion of the neural network comprises a first output layer, wherein the first portion of the neural network is configured to: (i) receive a vector of values representing a user from a second portion of the neural network, and (ii) generate, from the first output layer, the first metric for the user;

replacing the first portion of the neural network with a third portion of the neural network, wherein the third portion of the neural network is configured to:

(i) receive:

(a) the vector of values from the second portion of the neural network, and (b) additional user data for the user from the service, wherein the additional user data is related to a second application of the service, and (ii) generate, from a second output layer, a second metric for the user;

updating the third portion of the neural network using the second portion of the neural network and a second portion of the user data, wherein the second portion of the user data includes the user data related to the second application for a portion of the set of users, and wherein the portion of the set of users does not include the user;

receiving, from a communication device, a request from the user associated with the second application;

generating the second metric for the user using the neural network including the third portion of the neural network trained using the second portion of the neural network and the second portion of the first data, wherein the neural network including the third portion of the neural network receives at least data for the user of the service and outputs at least the second metric; and transmitting, to the communication device, a response to the request, wherein the response is generated based at least in part on the second metric for the user.

15. The one or more non-transitory computer readable media of claim 14, wherein the neural network is a deep neural network.

16. The one or more non-transitory computer readable media of claim 14, wherein the user data comprises one or more of: user characteristics, reviews, browsing activities, purchases, entertainment preferences, or customer service interactions.

17. The one or more non-transitory computer readable media of claim 14, wherein the user data includes one or more of: age, gender, income, spending levels, geographic location, ethnicity, or religion.

18. The one or more non-transitory computer readable media of claim 14, wherein the process further comprises one or more of:

presenting a selected advertisement regarding a particular item to the user based at least in part on the first metric;

setting the price of a product to a particular amount based at least in part on the first metric; or recommending a particular product to the user based at least in part on the first metric.

19. The one or more non-transitory computer readable media of claim 14, wherein the second application comprises determining a likelihood that the user will take an action.

20. The one or more non-transitory computer readable media of claim 19, wherein the action is taken by the user in response to one of: presenting a selected advertisement regarding a particular item to the user, setting the price of a product to a particular amount, or recommending a particular product to a user.

21. The one or more non-transitory computer readable media of claim 19, wherein the action comprises at least one of: of: purchasing the item, requesting additional information regarding the item, or recommending the item.

* * * * *

UNITED STATES PATENT AND TRADEMARK OFFICE
CERTIFICATE OF CORRECTION

PATENT NO. : 10,354,184 B1  
APPLICATION NO. : 14/313906  
DATED : July 16, 2019  
INVENTOR(S) : Shiv Naga Prasad Vitaladevuni et al.

Page 1 of 1

It is certified that error appears in the above-identified patent and that said Letters Patent is hereby corrected as shown below:

On the Title Page

In Column 1, Item (71), Line 1, under Applicant: delete "Reno, NV" and insert --Seattle, WA--.

In the Specification

In Column 7, Line 27, after "the" delete "a".

In the Claims

In Column 20, Line 60, Claim 21, after "of:" delete "of:".

Signed and Sealed this  
Twelfth Day of November, 2019

Andrei Iancu  
*Director of the United States Patent and Trademark Office*